April 24, 1951        J. E. DALTON        2,550,230
LOADING DUMP BODY

Filed June 26, 1947        2 Sheets-Sheet 1

INVENTOR.
James E. Dalton
BY *Victor J. Evans & Co.*
ATTORNEYS

April 24, 1951 J. E. DALTON 2,550,230
LOADING DUMP BODY
Filed June 26, 1947 2 Sheets-Sheet 2
Fig. 4.
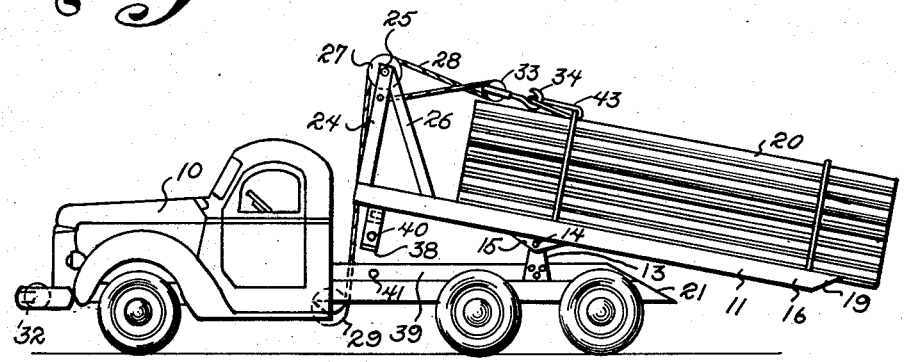
Fig. 5.
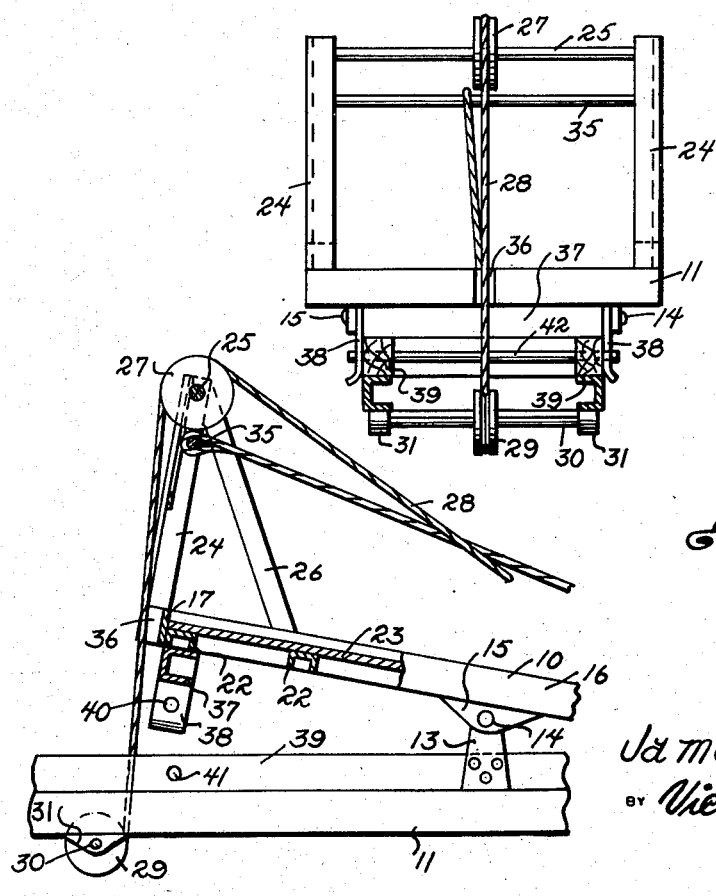
Fig. 6.
INVENTOR.
James E. Dalton
BY Victor J. Evans & Co.
ATTORNEYS Patented Apr. 24, 1951

2,550,230

UNITED STATES PATENT OFFICE 2,550,230

LOADING DUMP BODY

James E. Dalton, Burkeville, Va.

Application June 26, 1947, Serial No. 757,087

1 Claim. (Cl. 214—85)

This invention relates to improvements in mechanical loading dump bodies for automobile chassis or the like.

An object of the invention is to provide a body of this type that is loaded or unloaded by the use of a winch which is mounted on the front of the automobile chassis on which the body is mounted.

The body embodying the invention can be made of any size to fit the automobile chassis to be used, and is especially adapted for use with a logging truck or the like.

With the above and other objects and advantages in view, the invention consists of the novel details of construction, arrangement and combination of parts more fully hereinafter described, claimed and illustrated in the accompanying drawings in which:

Figure 4 is a side elevational view showing the body being elevated to unloading position;

Figure 5 is an elevational view partly in section of the front of the body and

Figure 6 is a detailed sectional view showing the manner of hitching the winch rope or cable to the body.

Figure 1:
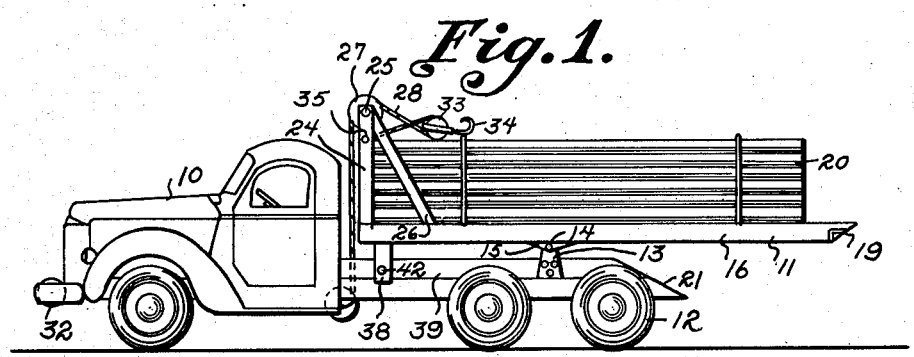
Figure 1 is a side elevational view of a body embodying the invention attached to a truck chassis and shown in load carrying position.

Referring more in detail to the drawings, the reference numeral 10 designates a two and one-half ton 6 x 6 truck which is of conventional design and used for purposes of illustrating the invention, since any type of truck chassis may be used to mount the body 11 thereon, as will be later described.

Above the rear wheels 12 of the truck 10, there is secured to the truck chassis at each side thereof, the vertically disposed plate 13, which journals the axle 14 therein. Mounted on the axle 14 for movement thereon are the bearings 15 which are secured to the side rails 16 of the body 11.

Figure 2:
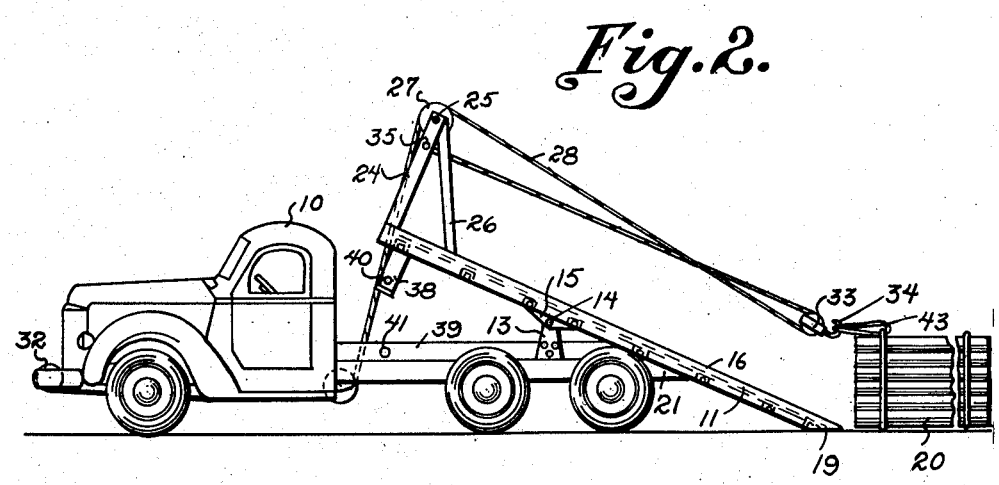
Figure 2 is the same in position to have the load pulled thereon.
Figure 3:
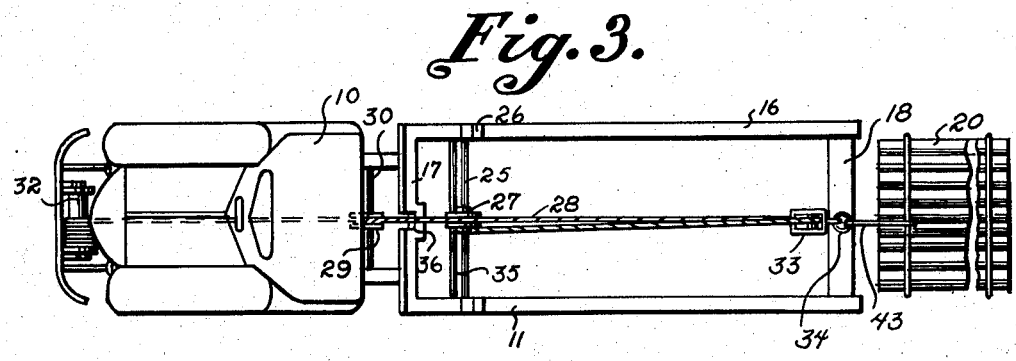
Figure 3 is a top plan view of Figure 2.

The side rails 16 are joined at the front by the cross rail 17, and at the rear by the cross rail 18. The cross rail 18 extends in a manner to conform in angularity with the beveled rear ends 19 of the side rails, which act as wear plates for the ends 19, so that when the body 11 is in the position shown in Figure 2, the end 19 will engage the ground surface to provide a ramp effect for receiving the load 20 on the body, as will be later described, and the rail 18 will prevent damage to the ends 19. It will be noted from the various views that the rear end of the chassis of the truck 10 is angled at 21 so that the side rails will move to the angle shown in Figure 2.

Cross rails 22, intermediate of the side rails 16, and secured thereto in any conventional manner, support the floor 23 of the body 10, at a level slightly below the upper surface of the side rails 16.

Secured to the front end of the side rails 16, in vertical relation thereto, are the uprights 24 which journal the axle 25, at the upper ends thereof, and angled braces 26, also journalling the axle 25 and secured at their lower ends to the side rails 16 brace the uprights 24 in the usual manner.

A grooved pulley 27 is carried by the axle 25 centrally thereof, and the pulley engages the rope or cable 28 which is trained over a pulley 29 carried by an axle 30 journalled in bearings 31 secured to the chassis of the truck 10, at a point slightly to the rear of the cab of the truck. The cable then extends under the truck to be attached to a winch 32 carried on the front of the truck 10.

The cable, after pressing over the pulley 25, is trained through the pulley block 33 carrying the hook 34 to be fixed at its end to the rod 35 carried by the uprights 24.

To prevent the cable from dragging on the cross bar 17, the bar is provided centrally thereof with the inset or notch 36, and just rearwardly of the inset 36, a cross bar 37 is secured to the chassis of the truck 10.

Secured to the ends of the bar 37 are the depending guide plates 38 which engage on the outside of the wood bolsters 39 secured to the chasis of the truck, and prevent side play of the body 11. To retain the body in the position shown in Figure 1, the plates 38 are apertured at 40, and the bolsters 39 are apertured at 41 to receive a cross bar 42, which, entering these apertures, retains the body in this position.

In use with the pulleys 27 and 29 transmitting the cable 28 from the winch 32, the hook 34 on the pulley block is attached by a loop 43 to the load 20. With the pulley 27 mounted by the uprights 24 at a height depending on the dimensions of the body in the position shown in Figure 2, the winch is started, and the load pulled onto the body 11. When the load is in position to cause the body to move to the position shown in Figure 1, the bar 42 is inserted into place, and the body is retained in this position. The side rails 16, extending beyond the level of the floor, prevent lateral shifting of the load, and the plates 38 prevent lateral shifting of the body 11. Thus the load and body are retained firmly in position on the truck 10. With the use of only one pulley block 33, a two cable pulley effect from the top of the body is obtained with only one cable pulling downwardly.

There has thus been provided a dumping body which will effectively load with the use of a winch, or will, due to the angularity of the dump body in unloading position, unload by gravity.

The body is efficient, inexpensive to manufacture, and mount, and is durable and can be mounted on any type of truck chassis.

It is believed that from the foregoing description, the construction and operation of the body will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a truck including a chassis, a vertically disposed plate extending upwardly from said chassis and secured thereto, a horizontally disposed axle supported by said plate, a pair of spaced parallel bearings journalled on said axle, a tiltable body provided with a pair of spaced parallel side rails secured to said bearings, a first cross rail extending between the front ends of said side rails and secured thereto, a second cross rail extending between the rear ends of said side rails and secured thereto, the lower rear portions of said side rails being bevelled, the rear portions of said chassis being bevelled for engaging said side rails when said body is in tilted position, a plurality of cross pieces extending between said side rails and secured thereto, a floor supported by said cross pieces, a pair of spaced parallel vertically disposed uprights secured to the front ends of said rails, an axle journalled in the upper ends of said uprights, a grooved pulley carried by said last named axle, a guide pulley disposed beneath the chassis substantially directly below said grooved pulley, a cable adapted to be connected to a power driven drum trained over said guide pulley and grooved pulley and adapted to be connected to a load, a pair of spaced parallel horizontally and longitudinally disposed bolsters supported upon said chassis and secured thereto, and means for locking said body to said bolsters when the body is in horizontal position.

JAMES E. DALTON.

REFERENCES CITED

The following references are of record in the file of this patent:

UNITED STATES PATENTS

| Number | Name | Date |
|---|---|---|
| 1,442,769 | Jackson et al. | Jan. 16, 1923 |
| 1,658,236 | Frazier | Feb. 7, 1928 |
| 1,856,787 | Schellentrager | May 3, 1932 |
| 1,870,573 | Kuchar | Aug. 9, 1932 |
| 1,897,383 | Burgoyne | Feb. 14, 1933 |
| 2,405,299 | Godwin | Aug. 6, 1946 |

FOREIGN PATENTS

| Number | Country | Date |
|---|---|---|
| 372,172 | Great Britain | May 5, 1932 |